Jan. 8, 1957 H. P. BROCKMAN 2,777,066
FREQUENCY DOUBLER CIRCUIT
Filed Aug. 11, 1954

WITNESSES
Edwin E. Bassler
T. H. Murray

INVENTOR
Herbert P. Brockman
BY
J. E. Browder
ATTORNEY

United States Patent Office 2,777,066
Patented Jan. 8, 1957

2,777,066

FREQUENCY DOUBLER CIRCUIT

Herbert P. Brockman, Baltimore, Md., assignor to Westinghouse Electric Corporation, East Pittsburgh, Pa., a corporation of Pennsylvania Application August 11, 1954, Serial No. 449,198

4 Claims. (Cl. 250—36)

This invention relates to a circuit which produces an output signal having twice the frequency of an input signal.

It is an object of my invention to provide a frequency doubler circuit in which the grid circuits of two triode amplification tubes are connected in parallel to a single-ended, low impedance voltage source.

Another object of my invention lies in the provision of a voltage doubler circuit which will transform a sine wave input into an output wave form that approaches a pure sine wave having a larger amplitude than the input wave form.

A still further object of the invention is to eliminate the possibility of output wave distortion which is present in conventional doubler circuits utilizing a double-ended input voltage source.

The above and other objects and features of my invention will become apparent from the following description taken in connection with the accompanying drawings which form a part of this specification and in which.

Figure 1:
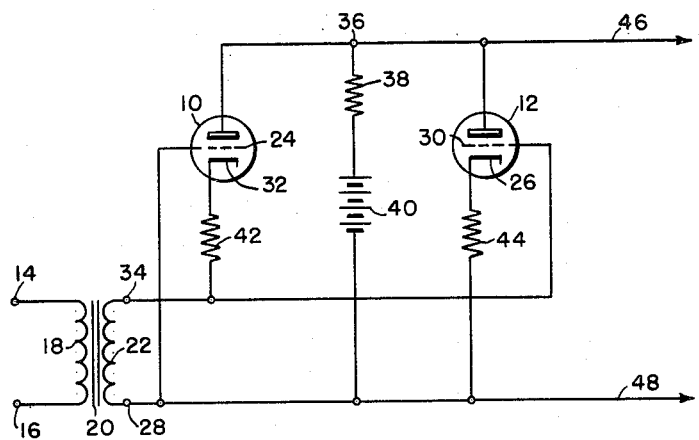
Figure 1 is an illustration of my invention in schematic form.

Referring to Fig. 1, the circuit shown includes two triodes 10 and 12. A source of alternating current input voltage is connected to terminals 14 and 16 and, hence, to the primary winding 18 of transformer 20. Although transformer 20 is shown and described in the present instance, it is to be understood that the circuit may be connected to any suitable A. C. current source, the only requirement being that the voltage source have a relatively low impedance with respect to the cathode resistors of each triode. Connected in parallel to secondary winding 22 of transformer 20 are the grid circuits of tubes 10 and 12. Note, however, that the grid 24 of tube 10 and the cathode 26 of tube 12 are connected to one terminal 28 of secondary winding 22, whereas grid 30 of tube 12 and cathode 32 of tube 10 are connected to the other terminal 34. Therefore, the grid 24 of tube 10 will be positive while the grid 30 of tube 12 is negative and vice versa. Each triode is operated as a class AB or class A amplifier, and use is made of the curvature of the transconductance versus current curve (characteristic of vacuum tubes) to obtain a pure sine wave output wave form. Tube 10 will conduct more heavily during one half of the charging cycle of the input voltage source and tube 12 will conduct more heavily during the other half. The circuit is, in this way, provided with a single-ended voltage source. By "single-ended" I mean that the same signal is applied to both grids of the doubler circuit. This is contrasted with the conventional "double-ended" circuit wherein two substantially identical signals (reversed in polarity with respect to each other) are applied to two control grids.

The anodes of tubes 10 and 12 are connected to a common junction 36 which is in turn connected through dropping resistance 38 to a source of anode voltage 40. Connected in the grid circuit of each of said tubes is a cathode bias resistor 42 or 44 which serves to minimize transconductance variations in the tubes which might otherwise tend to distort the output wave form.

Figure 2:
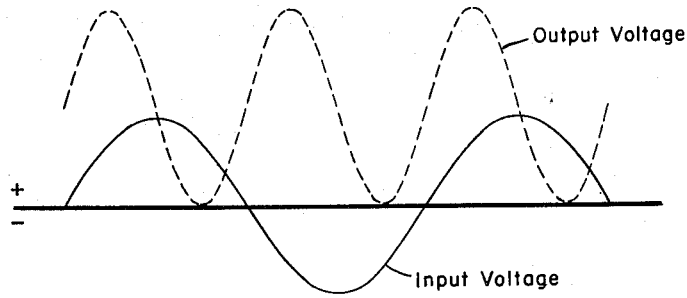
Fig. 2 is an approximate illustration of the amplitude and phase relationships which exist between the input voltage wave form and the output voltage wave form of the circuit of Figure 1.

In operation, an output wave form will appear between terminals 46 and 48 which is substantially a pure sine wave having a frequency equal to twice that of the input voltage source as shown in Fig. 2. During successive half cycles of the input voltage, amplified pulses of like polarity will appear alternately in the anode circuits of tubes 10 and 12. These voltage pulses add algebraically to form the aforesaid pure sine wave.

Although I have described my invention in connection with only one embodiment, it will be understood by those skilled in the art that various changes as to form and arrangement of parts can be made to suit requirements without departing from the spirit and scope of the invention.

I claim as my invention:

1. A frequency doubler circuit for converting a sine wave input into a sine wave output of double the input frequency comprising the combination of a source of alternating current voltage, first and second triode tubes, a connection between the anodes of said triodes, a path connecting the cathode of the first triode and the grid of the second triode to one side of said voltage source, a path connecting the cathode of the second triode and the grid of the first triode to the other side of said voltage source, and a cathode resistor included in the grid circuit of each of said triodes for minimizing the effect of transconductance variations therein.

2. A frequency doubler circuit for converting a sine wave input into a sine wave output of double the input frequency and comprising a transformer having primary and secondary windings, a source of alternating current voltage connected to the primary winding of said transformer, first and second electron discharge tubes, an anode, cathode and control grid included in each of said tubes, a source of anode voltage having its low potential side connected to a point of reference potential, means connecting the anodes of said tubes to the high potential side of said anode voltage source, means connecting one end of said secondary winding to said point of reference potential, means connecting the grid of said first tube and the cathode of said second tube to said point of reference potential, means connecting the grid of said second tube and the cathode of said first tube to the other end of said secondary winding, and means for deriving an output signal between the anode and cathode of said second tube.

3. A frequency doubler circuit for converting a sine wave input into a sine wave output of double the input frequency and comprising a source of alternating current input voltage, first and second electron discharge tubes, an anode, cathode and control grid included in each of said tubes, a source of anode voltage for said tubes having its negative terminal connected to a point of reference potential, a connection between one terminal of said input voltage source and said point of reference potential, means connecting the grid of said first tube and the cathode of said second tube to said point of reference potential; and means connecting the grid of said second tube and the cathode of said first tube to the other terminal of said input voltage source.

4. In combination with a source of alternating current voltage having two output terminals, first and second electron discharge tubes, an anode, cathode and control grid for each of said tubes, means connecting the anodes of said tubes, means connecting the grid of said first tube and the cathode of said second tube to one of said output terminals, means connecting the grid of said second tube and the cathode of said first tube to the other of said output terminals, and a pair of output leads connected to the anode of said second tube and to said one output terminal respectively for obtaining an alternating current output voltage therebetween which has a frequency double the frequency of said alternating current voltage source.

References Cited in the file of this patent

UNITED STATES PATENTS

| | | |
|---|---|---|
| 2,034,848 | Van Mennen et al. | Mar. 24, 1936 |
| 2,323,672 | Nelson | July 6, 1943 |